US012738813B2

(12) United States Patent
Yazawa et al.

(10) Patent No.: US 12,738,813 B2
(45) Date of Patent: Sep. 15, 2026

(54) ELECTRIC DEVICE AND PUMP DEVICE

(71) Applicant: NIDEC INSTRUMENTS CORPORATION, Nagano (JP)

(72) Inventors: Takehiko Yazawa, Nagano (JP); Takashi Yamamoto, Nagano (JP)

(73) Assignee: NIDEC INSTRUMENTS CORPORATION, Nagano (JP)

( * ) Notice: Subject to any disclaimer, the term of this patent is extended or adjusted under 35 U.S.C. 154(b) by 198 days.

(21) Appl. No.: 18/709,016

(22) PCT Filed: Nov. 11, 2022

(86) PCT No.: PCT/JP2022/042054

§ 371 (c)(1),
(2) Date: May 9, 2024

(87) PCT Pub. No.: WO2023/090267

PCT Pub. Date: May 25, 2023

(65) Prior Publication Data

US 2025/0007356 A1 Jan. 2, 2025

(30) Foreign Application Priority Data

Nov. 19, 2021 (JP) ................................ 2021-188390

(51) Int. Cl.

*H02K 11/00* (2016.01)
*H02K 7/14* (2006.01)
*H02K 11/33* (2016.01)

(52) U.S. Cl.

CPC ........... *H02K 11/0094* (2013.01); *H02K 7/14* (2013.01); *H02K 11/33* (2016.01); *H02K 2203/03* (2013.01)

(58) Field of Classification Search

CPC ............... H02K 11/0094; H02K 11/33; H02K 2203/03; H02K 2211/03; H02K 5/22; H02K 7/14

See application file for complete search history.

(56) References Cited

U.S. PATENT DOCUMENTS

2012/0104886 A1* 5/2012 Yamasaki ............ B62D 5/0406 310/71
2020/0029471 A1* 1/2020 Sugiura ................ B62D 5/0406

(Continued)

FOREIGN PATENT DOCUMENTS

CN 208015465 U * 10/2018 ............. H02K 3/522
CN 209233673 8/2019

(Continued)

OTHER PUBLICATIONS

"International Search Report (Form PCT/ISA/210) of PCT/JP2022/042054", mailed on Jan. 10, 2023, with English translation thereof, pp. 1-4.

*Primary Examiner* — Christopher M Koehler
*Assistant Examiner* — Ethan Nguyen Vo
(74) *Attorney, Agent, or Firm* — JCIPRNET

(57) ABSTRACT

In a motor of the pump device, a substrate includes a first terminal-soldered part to which a winding-wire terminal is connected and a second terminal-soldered part to which a connector terminal is connected. The substrate is fixed to the housing at two positions with a first fixing part and a second fixing part. When the distance between a first electric element, which is a maximum mass element having the largest mass on the substrate, and the second fixing part, which is a proximal fixing part closest to the first electric element among the two fixing parts, is taken as a first distance, and the distance between the proximal fixing part and a proximal soldering part closest to the proximal fixing part among multiple first terminal-soldered parts and mul- (Continued)

tiple second terminal-soldered parts is taken as a second distance, the first distance is smaller than the second distance.

10 Claims, 5 Drawing Sheets

(56) References Cited

U.S. PATENT DOCUMENTS

| | | | | |
|---|---|---|---|---|
| 2020/0036269 A1* | 1/2020 | Sugiura | .............. | H05K 7/20854 |
| 2021/0226506 A1* | 7/2021 | Tahara | ..................... | H02K 5/20 |

FOREIGN PATENT DOCUMENTS

| | | | | |
|---|---|---|---|---|
| JP | 2005261002 | | 9/2005 | |
| JP | 2011125179 | | 6/2011 | |
| JP | 2012249470 | | 12/2012 | |
| JP | 2018015867 | | 2/2018 | |
| JP | 2019115164 | | 7/2019 | |
| JP | 6749169 | B2 * | 9/2020 | ......... H05K 7/20409 |
| WO | WO-2018096704 | A1 * | 5/2018 | ........... H02K 15/085 |
| WO | WO-2021059793 | A1 * | 4/2021 | ............. H02K 5/225 |

* cited by examiner

ELECTRIC DEVICE AND PUMP DEVICE

CROSS-REFERENCE TO RELATED APPLICATION

This application is a 371 application of the International PCT application serial no. PCT/JP2022/042054, filed on Nov. 11, 2022, which claims the priority benefit of Japan Patent Application No. 2021-188390, filed on Nov. 19, 2021. The entirety of each of the above-mentioned patent applications is hereby incorporated by reference herein and made a part of this specification.

TECHNICAL FIELD

The present invention relates to an electric device including a substrate to which a terminal is connected with solder and relates to a pump device.

BACKGROUND ART

Patent Literature 1 describes a motor including a housing in which a rotor and a stator are housed. In the motor described in Patent Literature 1, a plurality of connector terminals is connected to the housing. A substrate electrically connecting the connector terminals and a winding-wire terminal is fixed to an end part of the housing. A fixing part fixed to the housing with a screw is provided to the outer peripheral edge of the substrate. The connector terminals and the winding-wire terminal line along the outer peripheral edge of the substrate, pass through holes penetrating the substrate, and are soldered.

CITATION LIST

Patent Literature

[Patent Literature 1] Chinese utility model registration No. 209233673 specification

SUMMARY OF THE INVENTION

Problems to be Solved by the Invention

In the configuration of Patent Literature 1, since the fixing part fixing the substrate to the housing with a screw is provided at one position, the substrate is likely to deflect due to external vibration. Therefore, there is a suggestion that two fixing parts are provided such that a substrate is fixed to the housing at two positions, thereby reducing deflection of the substrate.

However, in a case where an element with large mass such as a capacitor is mounted on a substrate, the moment of force applied to the position of the element is large when external vibration is applied. Consequently, the deformation amount of the substrate is large even when the substrate is fixed at two positions, the deformation amount at the position (terminal-soldered part) at which a terminal is soldered to the substrate is large, and large stress is applied to solder, which may cause generation of a solder crack. Conduction failure may occur at the position at which a solder crack generates.

In view of the above issues, a problem of the present invention is to prevent conduction failure in a terminal-soldered part due to the mass of an element mounted on a substrate.

Means for Solving the Problem

In order to solve the above problem, an electric device of the present invention has a housing, a power consumption part housed in the housing, and a substrate fixed to an end part of the housing, the electric device characterized in that the substrate includes a plurality of terminal-soldered parts to which a plurality of terminals including a power supply terminal connected to the power consumption part and a connector terminal held by the housing is soldered one by one, respectively; fixing parts fixing an edge of the substrate to the housing are provided at two positions; and when the distance between a maximum mass element having the largest mass among electric elements fixed to the substrate and a proximal fixing part closest to the maximum mass element among the two fixing parts is taken as a first distance, and the distance between the proximal fixing part and a proximal soldering part closest to the proximal fixing part among the plurality of terminal-soldered parts is taken as a second distance, the first distance is shorter than the second distance.

According to the present invention, since the housing and the substrate are fixed at two positions, deflection of the substrate is smaller than that in a case where a housing and a substrate are fixed at one position. Stress applied to the terminal-soldered parts can be reduced by reducing deflection of the substrate, and damage of the terminal-soldered parts can thus be suppressed. In addition, in the present invention, the distance (first distance) between the maximum mass element fixed to the substrate and the fixing part (proximal fixing part) closest to the maximum mass element is shorter than the distance (second distance) between the terminal-soldered part (proximal soldering part) closest to the proximal fixing part and the proximal fixing part. Damage of the terminal-soldered parts due to the moment of force applied from the maximum mass element to the substrate can be suppressed thereby. That is, by virtue of the above-described layout, deflection of the proximal soldering part is decreased, and deflection of another terminal-soldered part is also decreased. Accordingly, stress applied to the terminal-soldered parts can be reduced, and damage of the terminal-soldered parts can be suppressed. Consequently, conduction failure in the terminal-soldered parts can be suppressed.

In the present invention, the maximum mass element is preferably disposed on a virtual line connecting the two fixing parts. In this configuration, the position to which the moment of force from the maximum mass element is applied hardly deforms. Accordingly, since the maximum deformation amount of the substrate can be decreased, deflection of the terminal-soldered parts can be decreased. Consequently, damage of the terminal-soldered parts can be suppressed, and conduction failure in the terminal-soldered parts can be suppressed.

In the present invention, when one side of the virtual line connecting the two fixing parts is taken as a first region, and the other side of the virtual line opposite to the first region is taken as a second region on the substrate, the maximum mass element is preferably disposed in a region with a smaller area among the first region and the second region. In this configuration, the region to which the moment of force from the maximum mass element hardly deforms. Accordingly, since the maximum deformation amount of the substrate can be decreased, deflection of the terminal-soldered parts can be decreased. Consequently, damage of the terminal-soldered parts can be suppressed, and conduction failure in the terminal-soldered parts can be suppressed.

In the present invention, it is preferable that the substrate have a circular shape or a shape in which the circular shape is partially cut, the virtual line connecting the two fixing parts be located in a position deviating from the center of the circular shape, and when one side of the virtual line is taken as a first region, and the other side of the virtual line opposite to the first region is taken as a second region on the substrate, the maximum mass element be disposed in a region not including the center among the first region and the second region. In this configuration, in a case of a circular substrate, the region to which the moment of force from the maximum mass element is applied hardly deforms when the virtual line connecting the fixing parts does not pass the center of the substrate. Accordingly, since the maximum deformation amount of the substrate can be decreased, deflection of the terminal-soldered parts can be decreased. Consequently, damage of the terminal-soldered parts can be suppressed, and conduction failure in the terminal-soldered parts can be suppressed.

In the present invention, it is preferable that the plurality of terminal-soldered parts include a first terminal-soldered part to which the power supply terminal is soldered and a second terminal-soldered part to which the connector terminal is connected, and when one side of the virtual line connecting the two fixing parts is taken as a first region, and the other side of the virtual line opposite to the first region is taken as a second region on the substrate, the first terminal-soldered part be disposed in one of the first region and the second region, and the second terminal-soldered part be disposed in the other of the first region and the second region. In this configuration, since the first terminal-soldered part and the second terminal-soldered part are dispersively disposed, the distance between the fixing parts and the terminal-soldered parts is easily increased. Accordingly, even when stress is generated in the fixing parts due to a difference between the heat expansion coefficient of the housing and the heat expansion coefficient of the substrate, the stress is hardly transmitted to the terminal-soldered parts. Consequently, damage of the terminal-soldered parts can be suppressed.

The present invention may have a configuration in which the maximum mass element is a capacitor, the electric elements include a noise cut filter element with the second largest mass after the capacitor, the first terminal-soldered part, the capacitor, and the noise cut filter element are disposed in a region with a smaller area among the first region and the second region, and the noise cut filter element is disposed in a position closer to the first terminal-soldered part than the capacitor. In this configuration, the two electric elements (the capacitor and the noise cut filter element) with large mass can both be disposed on the side on which the deformation amount of the substrate is small, and the maximum deformation amount of the substrate can thus be decreased. Accordingly, damage of the terminal-soldered parts can be suppressed. In addition, since the connector terminal (second terminal-soldered part), the noise cut filter element, and the capacitor can be arranged on the substrate in this order in this arrangement, connection between elements is facilitated in composing a circuit for power feeding on the substrate.

In the present invention, the fixing parts are preferably fixed to the housing by means of a screw or crimping. The substrate can be firmly fixed to the housing in this way.

In the present invention, it is preferable that the housing include a wall portion surrounding the periphery of the substrate, and the screw penetrate the substrate and be screwed to a columnar part in a state where the substrate is in contact with the columnar part provided in a position spaced apart from the wall portion in the housing in each of the two fixing parts. In this configuration, even when the housing expands or shrinks in response to a temperature change, stress resulting from the deformation is hardly transmitted from the wall portion to the substrate via the columnar part. Consequently, damage of the terminal-soldered parts on the substrate can be suppressed.

The electric device according to the present invention can be used as a motor, and in this case, a stator is housed in the housing, the stator includes a stator core provided with a plurality of salient poles lining in the circumferential direction and a coil wound around the salient poles, a rotor is disposed inside the stator, the power consumption part is the coil, the power supply terminal is a winding-wire terminal connected to the coil, and the rotor is rotated with respect to the stator by applying current to the coil. In this configuration, in a substrate on which a winding-wire terminal of a motor and a connector terminal are soldered, damage of the terminal-soldered parts can be suppressed, and conduction failure in the terminal-soldered parts can be suppressed.

The motor according to the present can be used for a pump device, and in this case, an impeller rotary driven by the electric device (that is, the motor) described above is provided in the pump device.

Effect of the Invention

According to the present invention, since the housing and the substrate are fixed at two positions, deflection of the substrate is smaller than that in a case where a housing and a substrate are fixed at one position. Stress applied to the terminal-soldered parts can be reduced by reducing deflection of the substrate, and damage of the terminal-soldered parts can thus be suppressed. In addition, in the present invention, the distance (first distance) between the maximum mass element fixed to the substrate and the fixing part (proximal fixing part) closest to the maximum mass element is shorter than the distance (second distance) between the terminal-soldered part (proximal soldering part) closest to the proximal fixing part and the proximal fixing part. Damage of the terminal-soldered parts due to the moment of force applied from the maximum mass element to the substrate can be suppressed thereby. That is, by virtue of the above-described layout, deflection of the proximal soldering part is decreased, and deflection of another terminal-soldered part is also decreased. Accordingly, stress applied to the terminal-soldered parts can be reduced, and damage of the terminal-soldered parts can be suppressed. Consequently, conduction failure in the terminal-soldered parts can be suppressed.

MODE FOR CARRYING OUT THE INVENTION

Hereinafter, a motor and a pump device according to an embodiment of the present invention will be described with reference to the drawings. In the following description, an axial direction means a direction in which a central axis L of a motor 10 extends, a radial direction on a radially inner side and on a radially outer side means the radial direction centered around the central axis L, and a circumferential direction means a rotational direction centered around the central axis L.

(Overall Configuration)

Figure 1:
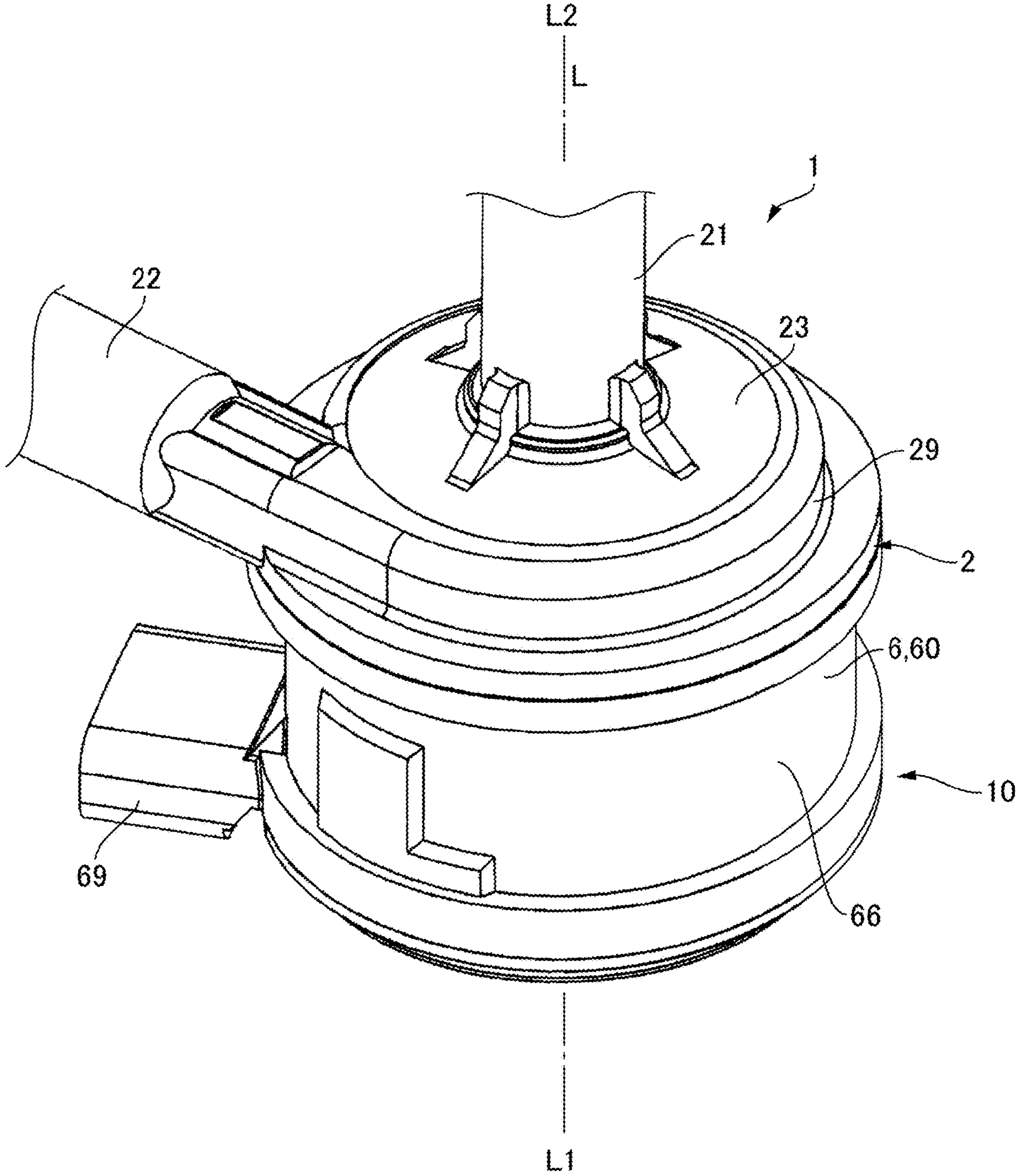
FIG. 1 is a perspective view of a pump device to which the present invention is applied.
Figure 2:
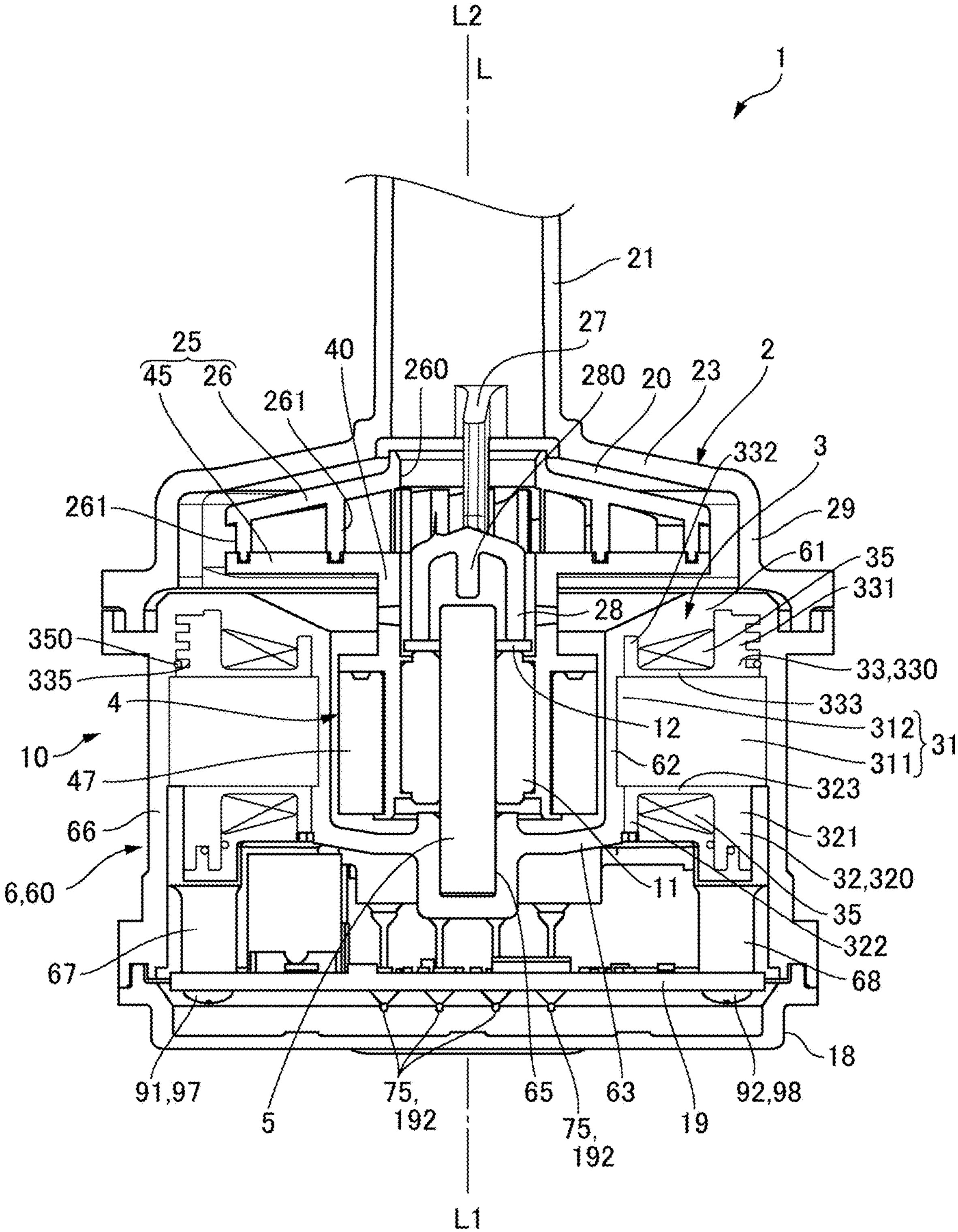
FIG. 2 is a cross-sectional view of the pump device illustrated in FIG. 1.

FIG. 1 is a perspective view of a pump device 1 to which the present invention is applied. FIG. 2 is a cross-sectional view of the pump device 1 illustrated in FIG. 1. As illustrated in FIG. 1 and FIG. 2, the pump device 1 has a case 2 provided with a suction pipe 21 and a discharge pipe 22, a motor 10 disposed on one side L1 of the case 2 in the axial direction, and an impeller 25 disposed in a pump chamber 20 inside the case 2. The impeller 25 is rotary driven around the central axis L by the motor 10. The motor 10 includes a cylindrical stator 3, a rotor 4 disposed inside the stator 3, and a resin housing 6 covering the stator 3, and a round bar-shaped support shaft 5 rotatably supporting the rotor 4. The support shaft 5 is made from a metal or a ceramic. In the pump device 1 of the present embodiment, fluid flowing through the pump chamber 20 is a liquid, and the pump device 1 is used under conditions under which the environmental temperature and the fluid temperature easily change.

As illustrated in FIG. 2, the pump chamber 20 is provided between the case 2 and the housing 6. The case 2 constitutes a wall surface 23 on the other side L2 of the pump chamber 20 in the axial direction and a side wall 29 extending in the circumferential direction. As illustrated in FIG. 1, the case 2 includes the suction pipe 21 extending along the central axis L of the motor 10 and the discharge pipe 22 extending in the direction perpendicular to the central axis L of the motor 10. The suction pipe 21 is concentrically provided with respect to the central axis L.

In the motor 10, the stator 3 has a stator core 31, insulators 32 and 33 held by the stator core 31, and a coil 35 wound around the stator core 31 via the insulators 32 and 33.

The rotor 4 includes a cylindrical part 40 extending along the central axis L. The cylindrical part 40 extends toward the pump chamber 20 from the radially inner side of the stator 3 and opens on the pump chamber 20. The outer peripheral surface of the cylindrical part 40 holds a cylindrical magnet 47. The magnet 47 faces the stator 3 on the radially inner side. The magnet 47 is a neodymium bonded magnet, for example.

In the rotor 4, a disc-shaped flange part 45 is formed in an end part on the other side L2 of the cylindrical part 40 in the axial direction, and a disc 26 is coupled to the flange part 45 from the other side L2 in the axial direction. A central hole 260 is formed in the center of the disc 26. Multiple blade parts 261 extending to the radially outer side while being curved in an arc shape from the periphery of the central hole 260 are formed at equal angular intervals on a surface of the disc 26 facing the flange part 45, and the disc 26 is fixed to the flange part 45 via the blade parts 261. Accordingly, the impeller 25 coupled to the cylindrical part 40 of the rotor 4 is constituted by the flange part 45 and the disc 26. In the present embodiment, the disc 26 is inclined in a direction toward the flange part 45 as the disc 26 extends to the radially outer side.

In the rotor 4, a cylindrical radial bearing 11 is held on the radially inner side of the cylindrical part 40 by means of crimping or the like. The rotor 4 is rotatably supported by the support shaft 5 via the radial bearing 11. An end part on the one side L1 of the support shaft 5 in the axial direction is held in a shaft hole 65 formed on a bottom wall 63 of the housing 6. A receiving part 280 facing, on the pump chamber 20 side, an end part on the other side L2 of the support shaft 5 to restrict the movable range of the support shaft 5 toward the pump chamber 20 side is formed in the case 2. The case 2 includes three support parts 27 extending from an inner peripheral surface of the suction pipe 21 toward the motor 10. A tube part 28 in which the support shaft 5 is located is formed in end parts of the support parts 27, and the receiving part 280 is provided in a bottom part on the other side L2 of the tube part 28 in the axial direction. An annular thrust bearing 12 is attached to an end part on the other side L2 of the support shaft 5, and the thrust bearing 12 is disposed between the radial bearing 11 and the tube part 28. Here, the end part on the one side L1 of the support shaft 5 and the shaft hole 65 at least partially have a D-shaped cross section. Further, the end part on the other side L2 of the support shaft 5 and the hole of the thrust bearing 12 have a D-shaped cross section. Accordingly, rotation of the support shaft 5 and the thrust bearing 12 with respect to the housing 6 is prevented.

The housing 6 is a resin sealing member 60 covering the stator 3 from both sides in the radial direction and both sides in the axial direction. The resin sealing member 60 is made from polyphenylene sulfide (PPS). The stator 3 is integrated with the resin sealing member 60 by insert molding. The housing 6 is a partition wall member having a first partition wall part 61 facing the wall surface 23 on the other side L2 in the axial direction of the pump chamber 20, a second partition wall part 62 interposed between the stator 3 and the magnet 47, and the bottom wall 63 provided at an end on the one side L1 of the second partition wall part 62. The housing 6 also includes a cylindrical body part 66 covering the stator 3 from the radially outer side.

Figure 3:
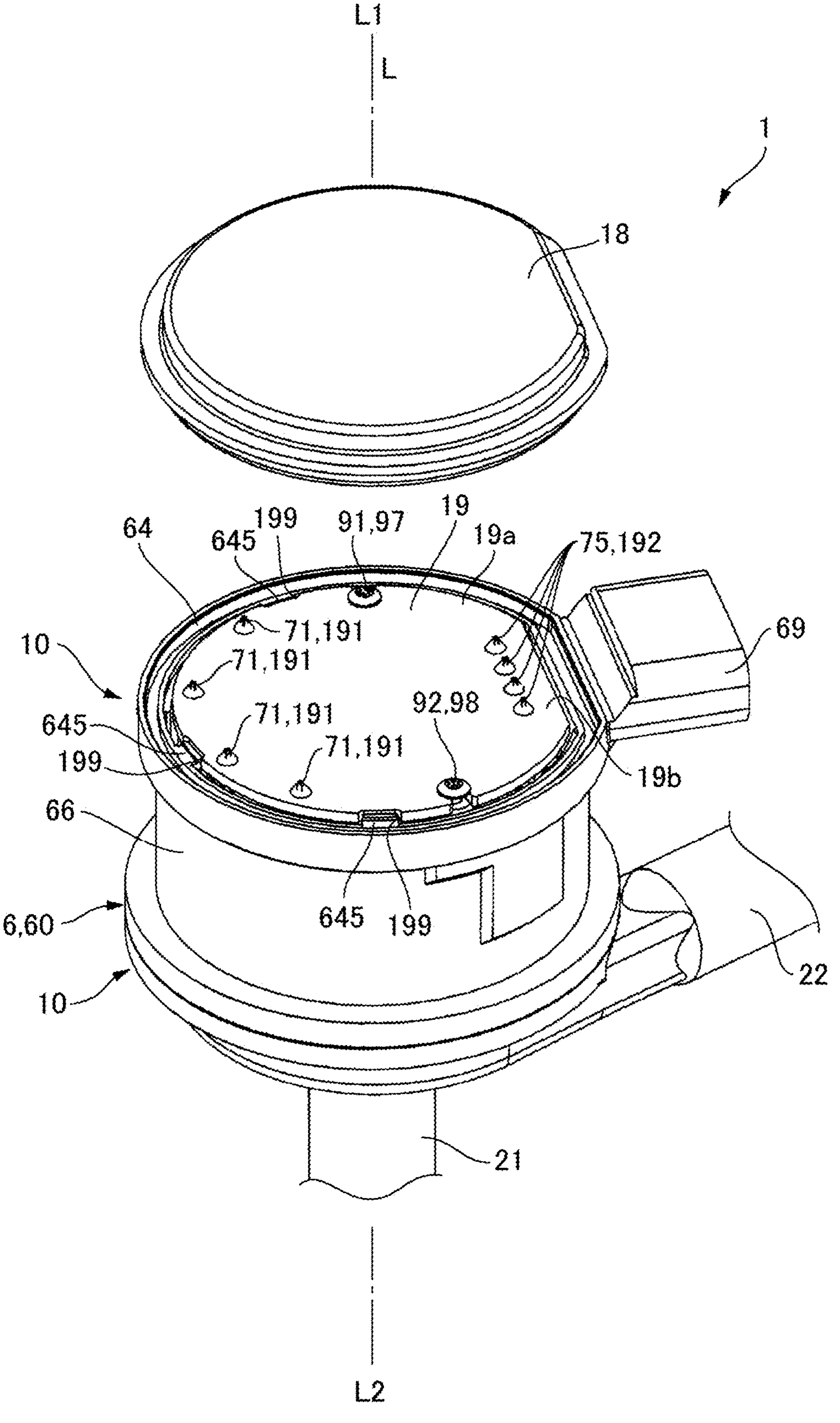
FIG. 3 is an exploded perspective view illustrating a state where a cover is removed from the pump device illustrated in FIG. 1.
Figure 4:
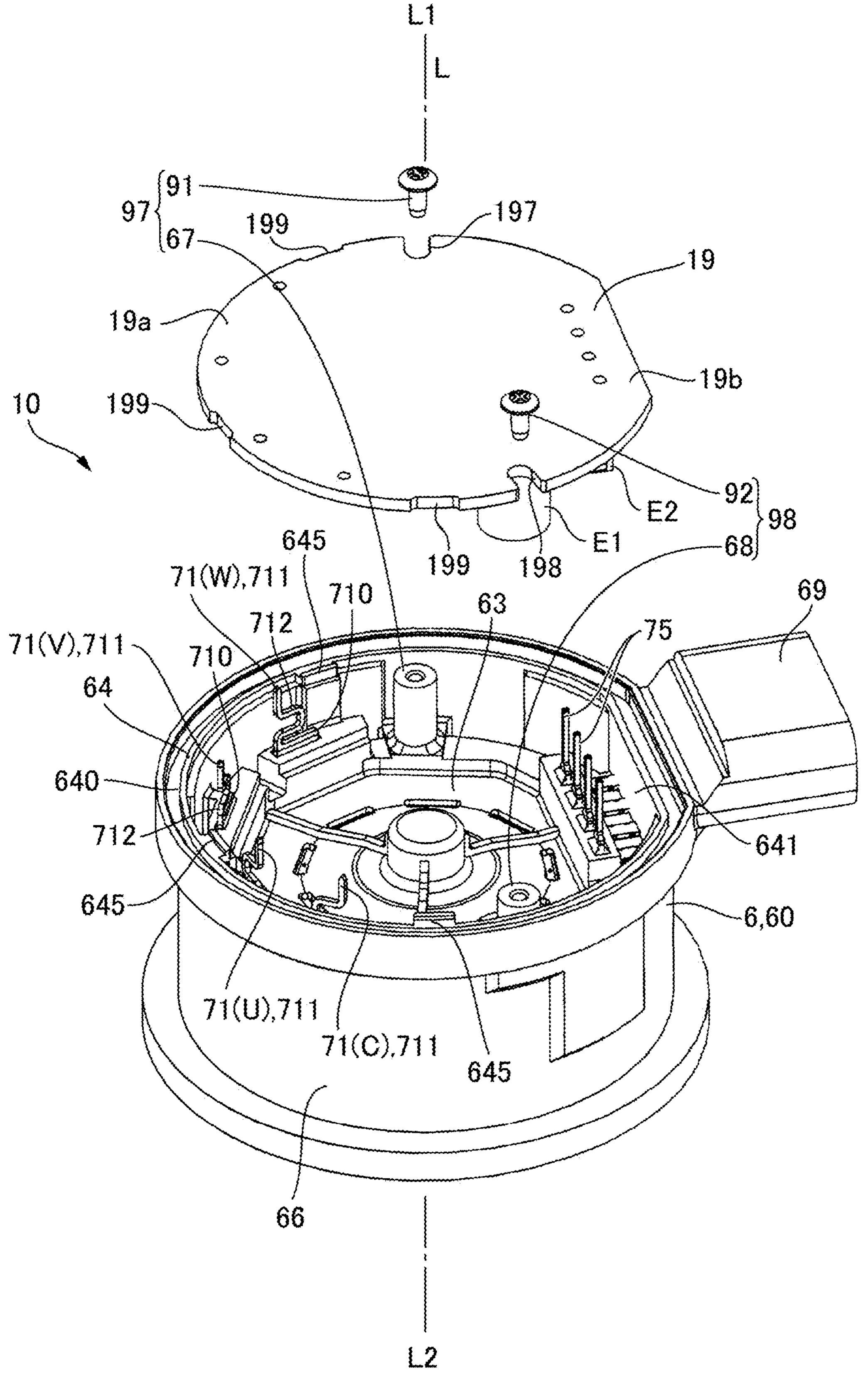
FIG. 4 is an exploded perspective view illustrating a state where a substrate is removed from the state illustrated in FIG. 3.

FIG. 3 is an exploded perspective view illustrating a state where a cover 18 is removed from the pump device 1 illustrated in FIG. 1. FIG. 4 is an exploded perspective view illustrating a state where a substrate 19 is removed from the state illustrated in FIG. 3. Incidentally, FIG. 3 and FIG. 4 are views viewed from the reverse direction along the axial direction from the case of FIG. 1 and FIG. 2, and the one side L1 in the axial direction is located on the upper side of the drawings.

As illustrated in FIG. 2 and FIG. 3, the cover 18 is fixed, from the one side L1 in the axial direction, to an end part 64 on the one side L1 of the housing 6 in the axial direction. The substrate 19 provided with a circuit for controlling power supply to the coil 35 is disposed between the cover 18 and the bottom wall 63 of the housing 6.

As illustrated in FIG. 3 and FIG. 4, the substrate 19 and the housing 6 have fixing parts fixing an edge of the substrate 19 and the housing 6 at two positions. In the present embodiment, a first fixing part 97 and a second fixing part 98 spaced apart from the first fixing part 97 in the circumferential direction are provided as the fixing parts. The second fixing part 98 is provided at a position deviated, in the circumferential direction, from the position opposite to the first fixing part 97 in the radial direction. The housing 6 includes a first columnar part 67 protruding from the bottom wall 63 to the one side L1 in the axial direction, and a second columnar part 68 protruding from the bottom wall 63 to the one side L1 in the axial direction at a position spaced apart from the first columnar part 67 in the circumferential direction. Furthermore, two notches 197 and 198 are provided to the edge of the substrate 19 respectively at positions spaced apart from each other in the circumferential direction. The first fixing part 97 is constituted by screwing a first screw 91 penetrating through one notch 197 to a first columnar part 67, and the second fixing part 98 is constituted by screwing a second screw 92 penetrating through the other notch 198 to a second columnar part 68. The first screw 91 and the second screw 92 are tapping screws.

The substrate 19 is provided with: a plurality of first terminal-soldered parts 191 to which metal winding-wire terminals 71 penetrating the bottom wall 63 of the housing 6 and protruding toward the one side L1 in the axial direction from the stator 3 are connected through soldering; and a second terminal-soldered part 192 to which a metal connector terminal 75 held by the housing 6 is connected through soldering. A circuit electrically connecting the second terminal-soldered part 192 and the first terminal-soldered parts 191 is mounted on the substrate 19. The circuit mounted on the substrate 19 is constituted by a wiring pattern and a plurality of electric elements including a first electric element E1, a second electric element E2, and a third electric element E3 described later (see FIG. 5).

The housing 6 includes a cylindrical connector housing 69 extending toward the radially outer side from the body part 66 surrounding the outer peripheral side of the stator 3. One end of the connector terminal 75 is connected to the substrate 19, and the other end of the connector terminal 75 is bent into a shape positioned inside the connector housing 69. Accordingly, when the connector is connected to the connector housing 69, driving current generated in the circuit mounted on the substrate 19 is supplied to each coil 35 via the first terminal-soldered parts 191 and the winding-wire terminals 71. As a result, the rotor 4 rotates around the central axis L of the motor 10. Consequently, the impeller 25 rotates inside the pump chamber 20 and pressure inside the pump chamber 20 becomes negative, and fluid is thus sucked into the pump chamber 20 from the suction pipe 21 and discharged from the discharge pipe 22.

As illustrated in FIG. 2, the stator core 31 of the stator 3 includes an annularly extending annular part 311 and a plurality of salient poles 312 protruding toward the radially inner side from the annular part 311. The salient poles 312 line in the circumferential direction at a certain pitch. The stator core 31 is a laminate core formed by laminating thin magnetic plates made from a magnetic material. In the present embodiment, the stator core 31 is produced by bending a linearly extending member into an annular shape and subsequently welding end parts of the annular part 311 together.

The insulator 32 overlaps the stator core 31 from the one side L1 in the axial direction, and the insulator 33 overlaps the stator core 31 from the other side in the axial direction. The insulators 32 and 33 include a plurality of divided insulators 320 and a plurality of divided insulators 330, respectively, the divided insulators 320 and 330 divided in the circumferential direction so as to correspond to the respective salient poles 312. Each of the divided insulators 320 includes an outer peripheral side portion 321 overlapping the annular part 311 of the stator core 31 from the axial direction, an inner peripheral side portion 322 protruding in the axial direction from an end part of the salient poles 312 on the radially inner side, and a tube part forming portion 323 connecting the outer peripheral side portion 321 and the inner peripheral side portion 322. Similarly, each of the divided insulators 330 includes an outer peripheral side portion 331 overlapping the annular part 311 of the stator core 31 from the axial direction, an inner peripheral side portion 332 protruding in the axial direction from an end part of the salient poles 312 on the radially inner side, and a tube part forming portion 333 connecting the outer peripheral side portion 331 and the inner peripheral side portion 332. The coils 35 are wound around the salient poles 312 via the tube part forming portions 323 and 333.

The motor 10 is a three-phase motor. Accordingly, the plurality of coils 35 is constituted by a U-phase coil, a V-phase coil, and a W-phase coil. The U-phase coil, the V-phase coil, and the W-phase coil are arranged in sequence in the circumferential direction. In the present embodiment, three U-phase coils, three V-phase coils, and three W-phase coils are disposed and the total number of coils 35 is nine. Accordingly, nine divided insulators 320 and nine divided insulators 330 are disposed and have the same structure.

In the present embodiment, three U-phase coils are constituted by one winding wire 350. The same is true of the V-phase coils and the W-phase coils. As illustrated in FIG. 2, a guide groove 335 in which the winding wire 350 (crossover) extending in the circumferential direction when the coil 35 is wound is disposed is provided on an outer surface of the outer peripheral side portion 321 of each of the nine divided insulators 330.

(Winding-Wire Terminal)

As illustrated in FIG. 4, four winding-wire terminals 71 (71(U), 71(V), 71(W), and 71(C)) are held by the housing 6. The winding-wire terminals 71 are arranged in the circumferential direction along the inner peripheral surface of the body part 66. Each of the four winding-wire terminals 71 includes a plate portion 710 with the plate thickness direction oriented in the radial direction, a substrate connection portion 711 extending in the axial direction on the one side L1 of the plate portion 710 in the axial direction, and a meander elastic portion 712 having a shape folded in the circumferential direction between the plate portion 710 and the substrate connection portion 711. The winding-wire terminal 71 also has: a leg portion (not shown) extending from the plate portion 710 toward the other side L2 in the axial direction and held by the divided insulators 320; and a winding-wire holding portion (not shown) bent to have a shape holding the winding wire 350. A large part of the plate portion 710 and the winding-wire holding portion are covered with the housing 6 (resin sealing member 60) through insert molding, and the elastic portion 712 and the substrate connection portion 711 protrude toward the one side L1 of the bottom wall 63 of the housing 6.

A divided insulator 320 corresponding to one of the three U-phase coils holds a winding-wire terminal 71 (U) connected to an end part on the winding start side of one winding wire 350 constituting the U-phase coil. A divided insulator 320 corresponding to one of the three V-phase coils holds a winding-wire terminal 71 (V) connected to an end part on the winding start side of one winding wire 350 constituting the V-phase coil. A divided insulator 320 corresponding to one of the three W-phase coils holds a winding-wire terminal 71 (W) connected to an end part on the winding start side of one winding wire 350 constituting the W-phase coil. Another one divided insulator 320 further holds a common terminal (not shown) and a winding-wire terminal 71(C) connected to the common terminal.

As illustrated in FIG. 4, the first terminal-soldered part 191 is constituted by inserting the substrate connection portion 711 of the winding-wire terminal 71 into a hole of the substrate 19 and soldering same. Since the winding-wire terminal 71 is provided with the elastic portion 712 between the plate portion 710 fixed to the divided insulators 320 via the leg portion and the substrate connection portion 711 soldered to the substrate 19, stress applied to the winding-wire terminal 71 can be absorbed by the elastic portion 712. Accordingly, transmission of stress from the winding-wire terminal 71 to the substrate 19 can be suppressed by the elastic portion 712. For example, damage of solder of the first terminal-soldered part 191 caused by application of stress to the second first terminal-soldered part 191 can be suppressed when the substrate 19 is deflected by stress applied to the substrate 19. In addition, even when heat generated in the coil 35 is transmitted to the winding-wire terminal 71 during driving the motor 10, and the winding-wire terminal 71 thermally expands, application of stress to the substrate 19 via the winding-wire terminal 71 can be suppressed, and damage of the circuit due to deflection of the substrate 19 can also be suppressed. Furthermore, even when the winding-wire terminal 71 thermally expands due to heat from resin when the stator 3 is sealed with resin, application of stress to the substrate 19 via the winding-wire terminal 71 can be suppressed, and damage of the circuit due to deflection of the substrate 19 can be suppressed.

(Substrate)

Figure 5:
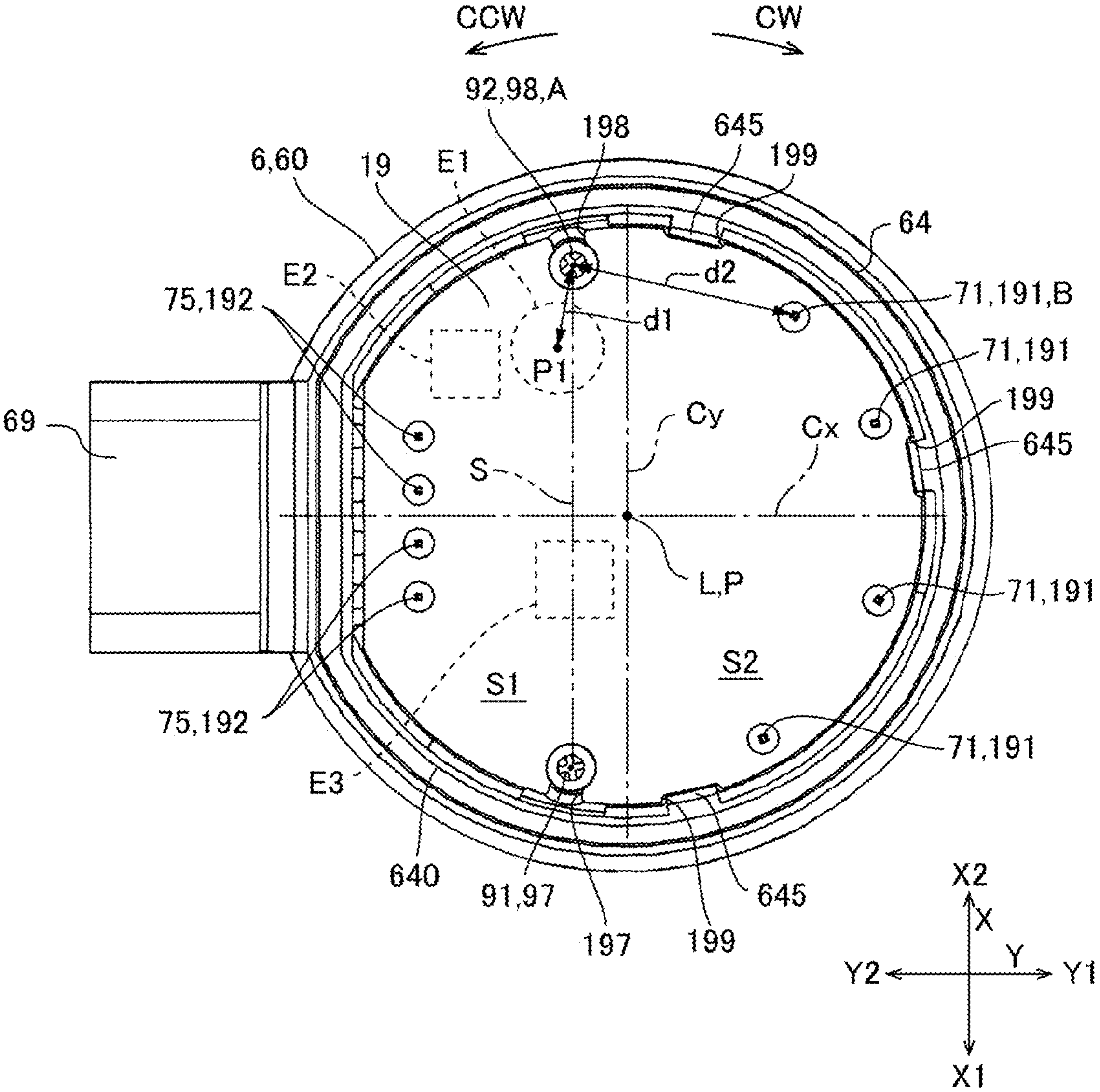
FIG. 5 is an illustrative drawing illustrating a layout of fixing parts fixing the substrate to a housing, terminal-soldered parts, and electric elements.

FIG. 5 is an illustrative drawing illustrating a layout of the fixing parts fixing the substrate 19 to the housing 6, the terminal-soldered parts, and electric elements. In the present specification, the direction perpendicular to the central axis L of the motor 10 is denoted as a first direction X, and the direction perpendicular to the central axis L and perpendicular to the first direction X is denoted as a second direction Y. The second direction Y is a direction connecting the center of the connector housing 69 in the circumferential direction and the central axis L of the motor 10. In FIG. 5, a central line Cx of the substrate 19 in the first direction X and a central line Cy of the substrate 19 in the second direction Y are represented by dash-dotted lines. The intersecting point of the central lines Cx and Cy is the central point P of the substrate 19. The central axis L of the motor 10 intersects with the central point P of the substrate 19.

As illustrated in FIG. 3, FIG. 4, and FIG. 5, the substrate 19 is a flat circle shape centered on the central axis L of the motor 10, with part of the circle shape cut along a linear line perpendicular to the radial direction. Accordingly, the outer peripheral edge of the substrate 19 includes a circular arc portion 19*a* and a linear portion 19*b* perpendicular to the radial direction. The end part 64 on the one side L1 of the housing 6 includes an arc-shaped wall portion 640 surrounding the periphery of the circular arc portion 19*a* of the substrate 19, and a flat portion 641 linearly extending along the linear portion 19*b* of the substrate 19 (see FIG. 4). The flat portion 641 extends in the first direction X and is disposed on the radially inner side of the connector housing 69.

A locking recessed portion 199 with which a locking projection 645 protruding toward the radially inner side from the arc-shaped wall portion 640 is engaged is provided in the outer peripheral edge of the substrate 19. The substrate 19 is positioned in the circumferential direction by the locking projection 645 and the locking recessed portion 199. As illustrated FIG. 5, three pairs of the locking projection 645 and the locking recessed portion 199 are disposed in the circumferential direction at positions spaced apart on one side Y1 (that is, the side opposite to the linear portion 19*b* in the radial direction) in the second direction Y from the central line Cx of the substrate 19 in the first direction X. The locking projection 645 and the locking recessed portion 199 positioned at the center in the circumferential direction is disposed in the vicinity of the central line Cx. The other two pairs of the locking projection 645 and the locking recessed portion 199 are disposed at positions facing each other across the central line Cx and disposed in the vicinity of the central line Cy.

Two fixing parts (the first fixing part 97 and the second fixing part 98) fixing the substrate 19 and the housing 6, the plurality of first terminal-soldered parts 191, and the plurality of second terminal-soldered part 192 are disposed along the outer peripheral edge of the substrate 19.

As illustrated in FIG. 5, the first fixing part 97 and the second fixing part 98 are disposed at symmetry positions with reference to the central line Cx in the first direction X. The first fixing part 97 is disposed on one side X1 from the center of the substrate 19 in the first direction X, and the second fixing part 98 is disposed on the other side X2 from the center of the substrate 19 in the first direction X. In addition, the first fixing part 97 and the second fixing part 98 are disposed at positions deviated from the center of the substrate 19 in the second direction Y and are disposed on the other side Y2 from the central line Cy in the second direction Y.

A virtual line S connecting the first fixing part 97 and the second fixing part 98 is represented by a dash-double-dot line in FIG. 5. The virtual line S extends in the first direction X and is perpendicular to the second direction Y. The virtual line S passes a position deviating from the intersecting point (that is, the central point P of the substrate 19) of the central lines Cx and Cy and shifts toward the other side Y2 in the second direction Y from the central point P.

The plurality of first terminal-soldered parts 191 is positioned on one side Y1 in the second direction Y from the virtual line S. In the present embodiment, the number of the winding-wire terminals 71 is four, and four first terminal-soldered parts 191 are provided. The four first terminal-soldered parts 191 line in the circumferential direction along the circular arc portion 19*a*. The four first terminal-soldered parts 191 are dispersively disposed on the one side X1 and the other side X2 in the first direction X two by two with reference to the central line Cx of the substrate 19 in the first direction X.

The plurality of second terminal-soldered parts 192 is positioned on the other side Y2 in the second direction Y from the virtual line S. In the present embodiment, the number of the connector terminals 75 is four, and four second terminal-soldered parts 192 are provided. The four second terminal-soldered parts 192 line in the first direction X along the linear portion 19*b* at a constant interval. The four second terminal-soldered parts 192 are dispersively disposed on the one side X1 and the other side X2 in the first direction X two by two with reference to the central line Cx of the substrate 19 in the first direction X.

In such a manner, in the present embodiment, the angle range in which the plurality of first terminal-soldered parts 191 is disposed and the angle range in which the plurality of second terminal-soldered parts 192 is disposed are both regions including the center of the substrate 19 in the first direction X.

(Layout of Electric Element)

A circuit for supplying driving current to the coils 35 is mounted on the substrate 19, and a plurality of electric elements including a first electric element E1, a second electric element E2, and a third electric element E3 is mounted on a substrate surface on the side opposite to the cover 18. In FIG. 5, positions to which the first electric element E1, the second electric element E2, and the third electric element E3 are fixed are represented by dotted lines.

The first electric element E1 is a maximum mass element having the largest mass among the electric elements disposed on the substrate 19. The second electric element E2 is an element with the second largest mass among the electric elements disposed on the substrate 19. The third electric element E3 is an element with the third largest mass among the electric elements disposed on the substrate 19. In the present embodiment, the first electric element E1 (maximum mass element) is a capacitor. The second electric element E2 is a noise cut filter element. The third electric element E3 is an IC element. The mass of the first electric element E1 is 0.82 g, for example. The mass of the second electric element E2 is 0.5 g, for example. The mass of the third electric element E3 is 0.13 g, for example. Incidentally, the type (function) and the mass of each electric element may differ from those described above.

In the present embodiment, as a result of considering deflection of the substrate 19 due to the moment of force applied to the substrate 19 from an electric element with large mass, the electric elements and the terminal-soldered parts on the substrate 19 are arranged as illustrated in FIG. 5. As illustrated in FIG. 5, the first electric element E1, which is the maximum mass element, is positioned on the other side X2 from the central line Cx in the first direction X. Accordingly, when the fixing part closest to the first electric element E1, which is the maximum mass element, is taken as a proximal fixing part A, the proximal fixing part A is the second fixing part 98 in the arrangement illustrated in FIG. 5.

In addition, when a position closest to the proximal fixing part A (second fixing part 98) among all of the terminal-soldered parts is taken as a proximal soldering part B, the proximal soldering part B is the first terminal-soldered part 191 adjacent to the proximal fixing part A on one side CW in the circumferential direction in the arrangement illustrated in FIG. 5. The proximal soldering part B is the first terminal-soldered part 191 positioned farthest on the other side CCW in the circumferential direction among the four first terminal-soldered parts 191 lining in the circumferential direction in the end part on the other side Y2 of the substrate in the second direction Y.

The first electric element E1 (maximum mass element) is disposed at a position such that when the distance between the proximal fixing part A and the first electric element E1 is taken as a first distance d1, and the distance between the proximal fixing part A and the proximal soldering part B is taken as a second distance d2, the condition of d1<d2 is satisfied. Since the moment of force applied to the position of the first electric element E1 is large when vibration is applied to the substrate 19, the position of the first electric element E1 greatly deflects. Since a layout satisfying d1<d2 is employed in the present embodiment, deflection of the substrate 19 at the position of the proximal soldering part B is smaller than deflection at the position of the first electric element E1. In addition, since the distance between the proximal fixing part A and each of other terminal-soldered parts is larger than d2, deflection of the substrate 19 at other terminal-soldered parts is smaller.

The first electric element E1 (maximum mass element) is positioned on the virtual line S. Here, in the state of "positioning on the virtual line S," only part of the electric element is needed to be positioned on the virtual line S, and the arrangement is not limited to the case where the gravity center of the electric element is positioned on the virtual line S. In the arrangement illustrated in FIG. 5, although the gravity center P1 of the first electric element E1 is not positioned on the virtual line S and at a position deviating from the virtual line S toward the other side Y2 in the second direction Y, part of the first electric element E is positioned on the virtual line S. Since the substrate 19 is fixed to the housing 6 at two positions, the substrate 19 deflects with the virtual line S connecting the two fixing points as a center. Therefore, deflection of the substrate 19 is small when the position to which the moment of force is applied from an electric element is on the virtual line S.

On the substrate 19, when among two regions partitioned by the virtual line S, the region not including the central point P of the substrate 19 is taken as a first region S1, and the region in which the central point P exists is taken as a second region S2, the first region S1 has an area smaller than that of the second region S2. In the present embodiment, all of the first electric element E1, the second electric element E2, and the third electric element E3 are disposed on the virtual line S or within the first region S1.

In a case where an electric element with large mass is disposed at a position deviating from the virtual line S, the electric element is disposed in a region with a smaller area of the first region S1 and the second region S2. In the present embodiment, the second electric element E2 with the second largest mass is disposed within the first region S1. Since a deflection amount in the region with a smaller area is small, deflection of the substrate 19 can be decreased by disposing an electric element with large mass in the first region S1.

In the arrangement illustrated in FIG. 5, the second electric element E2 (noise cut filter element) is disposed at a position closer to the first terminal-soldered parts 191 than the first electric element E1 (capacitor). More specifically, the second electric element E2 is positioned on the other side Y2 in the second direction Y with respect to the first electric element E1, and the second terminal-soldered parts 192 to which the connector terminals 75 are connected are disposed on the other side Y2 in the second direction Y with respect to the second electric element E2. When constituting a power supply circuit, current supplied from the connector terminals 75 is supplied to the first electric element E1 (capacitor) via the second electric element E2 (noise cut filter element).

The third electric element E3 is positioned on the virtual line S. The third electric element E3 is positioned on the one side X1 from the central line Cx in the first direction X.

Main Operational Advantages of Present Embodiment

As described above, the pump device 1 of the present embodiment includes the motor 10 and the impeller 25 rotary driven by the motor 10. The motor 10 has the housing 6 in which the stator 3 is housed, and the substrate 19 fixed to the end part of the housing 6. The substrate 19 includes: the plurality of first terminal-soldered parts 191 to which the plurality of winding-wire terminals 71 connected to the coil 35 of the stator 3 is soldered one by one; and the plurality of second terminal-soldered parts 192 to which the plurality of connector terminals 75 held by the housing 6 is soldered one by one. Two fixing parts, the first fixing part 97 and the second fixing part 98 are provided as a fixing part fixing the edge of the substrate 19 to the housing 6. When the distance between the first electric element E1, which is the maximum mass element having the largest mass among the electric elements fixed to the substrate 19, and the proximal fixing part A (second fixing part 98) closest to the maximum mass element (first electric element E1) among the two fixing parts is taken as the first distance d1, and the distance between the proximal fixing part A and the proximal soldering part B closest to the proximal fixing part A among the plurality of first terminal-soldered parts 191 and the plurality of second terminal-soldered parts 192 is taken as the second distance d2, the first distance d1 is smaller than the second distance d2.

In the present embodiment, the housing 6 and the substrate 19 are fixed at two positions. Accordingly, when vibration is applied to the substrate 19 due to disturbance or the like, deflection of the substrate 19 is smaller than a case where the substrate 19 is fixed only at one position. When deflection of the substrate 19 is hardly caused, cracks are hardly generated in solder on the substrate 19. Accordingly, since cracks are hardly generated in solder of the first terminal-soldered parts 191 and the second terminal-soldered parts 192, conduction failure in the first terminal-soldered parts 191 and the second terminal-soldered parts 192 can be suppressed.

In addition, in the present embodiment, the distance (first distance d1) between the maximum mass element (first electric element E1) fixed to the substrate 19 and the proximal fixing part A is smaller than the distance (second distance d2) between the proximal soldering part B and the proximal fixing part A. Consequently, a configuration in which deflection of the substrate 19 due to the moment of force applied from the maximum mass element is decreased at the position of the proximal soldering part B can be provided. In addition, deflection at the positions of the other terminal-soldered parts is smaller than deflection at the position of the proximal soldering part B. Accordingly, damage (that is, generation of solder cracks) of the first terminal-soldered parts 191 and the second terminal-soldered parts 192 due to moment of force applied from the mass point of the maximum mass element to the substrate 19 can be suppressed, and conduction failure in the first terminal-soldered parts 191 and the second terminal-soldered parts 192 can thus be suppressed.

In the present embodiment, since the maximum mass element (first electric element E1) is disposed on the virtual line S connecting the first fixing part 97 and the second fixing part 98, the position of the substrate 19 to which moment of force from the first electric element E1 is applied hardly deforms. Accordingly, since the deformation amount of the substrate 19 can be decreased, deflection of the first terminal-soldered parts 191 and the second terminal-soldered parts 192 can be decreased. Consequently, damage of the first terminal-soldered parts 191 and the second terminal-soldered parts 192 can be suppressed, and conduction failure in the first terminal-soldered parts 191 and the second terminal-soldered parts 192 can be suppressed.

In the present embodiment, when one side of the virtual line S connecting the first fixing part 97 and the second fixing part 98 is taken as the first region S1, and the side of the virtual line S opposite to the first region S1 is taken as the second region S2 on the substrate 19, the maximum mass element (first electric element E1) is disposed in a region (first region S1) with a smaller area among of the first region S1 and the second region S2. Accordingly, the substrate 19 hardly deforms since the area of the region to which moment of force from the first electric element E1 is applied is small. Since the deformation amount of the substrate 19 can be decreased thereby, deflection of the first terminal-soldered parts 191 and the second terminal-soldered parts 192 can be decreased. Consequently, damage of the first terminal-soldered parts 191 and the second terminal-soldered parts 192 can be suppressed.

More specifically, the substrate 19 of the present embodiment has a shape in which a circular shape is partially cut, the virtual line S connecting the first fixing part 97 and the second fixing part 98 is located in a position deviating from the central point P of the circular shape, and when one side of the virtual line S is taken as the first region S1, and the side of the virtual line S opposite to the first region S1 is taken as the second region S2 on the substrate 19, the first electric element E1 is disposed in the region not including the central point P of the substrate 19. In such a configuration, the region to which the moment of force from the first electric element E1 is less likely to deform, and the deformation amount of the substrate 19 is decreased. Accordingly, damage of the first terminal-soldered parts 191 and the second terminal-soldered parts 192 disposed in the end part of the substrate 19 can be suppressed.

In the present embodiment, the substrate 19 includes the first terminal-soldered parts 191 to which the winding-wire terminals 71 are soldered and the second terminal-soldered parts 192 to which the connector terminals 75 are connected. In the layout of these terminal-soldered parts on the substrate 19, when one side of the virtual line S connecting the first fixing part 97 and the second fixing part 98 is taken as the first region S1, and the side of the virtual line S opposite to the first region S1 is taken as the second region S2, the second terminal-soldered parts 192 are disposed in the first region S1 and the first terminal-soldered parts 191 are disposed in the second region S2. In this layout, the terminal-soldered parts (the first terminal-soldered parts 191 and the second terminal-soldered parts 192) can be dispersively disposed on the respective sides of the virtual line S, and the distance between the fixing parts (the first fixing part 97 and the second fixing part 98) and the terminal-soldered parts is easily increased. Consequently, even when stress is generated in the fixing parts due to a difference between the heat expansion coefficient of the housing 6 and the heat expansion coefficient of the substrate 19, the stress is hardly transmitted to the first terminal-soldered parts 191 and the second terminal-soldered parts 192; thus, the first terminal-soldered parts 191 and the second terminal-soldered parts 192 are hardly damaged.

In addition, in the present embodiment, the first terminal-soldered parts 191 and the second terminal-soldered parts 192 are disposed respectively in the first region S1 and the second region S2 both including the center of the substrate 19 in the first direction X. Accordingly, the first terminal-soldered parts 191 and the second terminal-soldered parts 192 are separated from the first fixing part 97 and the second fixing part 98, respectively, in the second direction Y. Consequently, even when stress is generated in the first fixing part 97 and the second fixing part 98 due to a difference between the heat expansion coefficient of the resin housing 6 and the heat expansion coefficient of the substrate 19, the stress is hardly transmitted to the first terminal-soldered parts 191 and the second terminal-soldered parts 192; thus, the first terminal-soldered parts 191 and the second terminal-soldered parts 192 are hardly damaged.

In the present embodiment, the maximum mass element (first electric element E1) is a capacitor. In addition, the electric elements mounted on the substrate 19 include a noise cut filter element (second electric element E2) with the second largest mass after the capacitor (first electric element E1), and the first electric element E1 and the second electric element E2 are disposed in the first region S1. The noise cut filter element is disposed at a position closer to the second terminal-soldered parts 192 than the capacitor (first electric element E1). In this configuration, the two electric elements with large mass are both disposed in the first region S1 (region with a small area). Accordingly, since deflection of the substrate 19 is small, damage of the first terminal-soldered parts 191 and the second terminal-soldered parts 192 can be suppressed. In addition, since the connector terminals 75 (second terminal-soldered parts 192), the noise cut filter element, and the capacitor line in this order in this arrangement, connection between elements is facilitated when a circuit for power supply is constituted.

In the present embodiment, the first fixing part 97 and the second fixing part 98 are configured to fix the substrate 19 to the housing 6 with screws, the fixing method is not limited to screws. For example, a configuration in which a crimping part is provided to the end part 64 of the housing 6 for crimping may be employed. The substrate 19 can be firmly fixed to the housing 6 through fixing with a screw or crimping. Alternatively, a configuration in which the substrate 19 is fixed by interposing an end part of the substrate 19 between the cover 18 and the housing 6 may be employed.

In the present embodiment, the housing 6 includes the wall portion 640 surrounding the periphery of the substrate 19, and, in the first fixing part 97 and the second fixing part 98, the first screw 91 and the second screw 92 penetrate the substrate 19 and are screwed to the first columnar part 67 and the second columnar part 68 in the state where the substrate 19 is in contact with the first columnar part 67 and the second columnar part 68 that are provided at positions spaced apart and radially inward from the wall portion 640 in the housing 6, respectively. In this configuration, even when the housing 6 expands or shrinks in response to a temperature change, stress resulting from the deformation is hardly transmitted from the wall portion 640 to the substrate 19 via the first columnar part 67 and the second columnar part 68. Accordingly, damage of the first terminal-soldered parts 191 and the second terminal-soldered parts 192 resulting from deformation of the substrate 19 can be suppressed.

In the present embodiment, at least part of the first columnar part 67 and at least part of the second columnar part 68 overlap the annular part 311 of the stator core 31 when viewed from the axial direction. Here, since the plurality of divided insulators 320 is held in the stator core 31, at least part of the first columnar part 67 and at least part of the second columnar part 68 can be configured to overlap the annular part 311 of the stator core 31 via a gap between two adjacent divided insulators 320 among the plurality of divided insulators 320 when viewed from the axial direction. In this configuration, even when the housing 6 expands or shrinks in response to a temperature change, deformation of the first columnar part 67 and the second columnar part 68 can be suppressed by the stator core 31. Accordingly, a configuration in which expansion or shrinkage of the housing 6 is hardly transmitted to the substrate 19 via the first columnar part 67 and the second columnar part 68.

OTHER EMBODIMENTS

In the above-described embodiment, the present invention is applied to the motor 10 that includes the housing 6 in which the stator 3 is housed and the substrate 19 fixed to the housing 6, in which the stator 3 includes the coil 35 as a power consumption part, and the motor 10 includes the winding-wire terminals 71 as a terminal supplying power to the coil 35; however, the present invention can be applied to an electric device other than the motor 10. That is, the present invention can be applied to an electric device having a housing, a power consumption part housed in the housing, and a substrate fixed to an end part of the housing, in which the substrate includes a plurality of terminal-soldered parts to which a plurality of terminals including a power supply terminal connected to the power consumption part and a connector terminal held by the housing is soldered one by one, respectively. The power consumption part can be any electric/electronic parts or units to which current is supplied from a terminal connected to the substrate.

In addition, although the motor 10 according the present embodiment is used to the pump device 1, the present invention can be applied to a motor used to a device other than the pump device 1.

The invention claimed is:

1. An electric device comprising:

a housing;

a power consumption part, housed in the housing; and a substrate, fixed to an end part of the housing, wherein the substrate includes a plurality of terminal-soldered parts to which a plurality of terminals including a power supply terminal connected to the power consumption part and a connector terminal held by the housing is soldered one by one, respectively, fixing parts fixing an edge of the substrate to the housing are provided at two positions, and when a distance between a maximum mass element having the largest mass among electric elements fixed to the substrate and a proximal fixing part closest to the maximum mass element among the two fixing parts is taken as a first distance, and a distance between the proximal fixing part and a proximal soldering part closest to the proximal fixing part among the plurality of terminal-soldered parts is taken as a second distance, the first distance is shorter than the second distance.

2. The electric device according to claim 1, wherein the maximum mass element is disposed on a virtual line connecting the two fixing parts.

3. The electric device according to claim 1, wherein when one side of the virtual line connecting the two fixing parts is taken as a first region, and a side of the virtual line opposite to the first region is taken as a second region on the substrate, the maximum mass element is disposed in a region with a smaller area among the first region and the second region.

4. The electric device according to claim 1, wherein the substrate has a circular shape or a shape in which the circular shape is partially cut, the virtual line connecting the two fixing parts is located in a position deviating from a center of the circular shape, and when one side of the virtual line is taken as a first region, and a side of the virtual line opposite to the first region is taken as a second region on the substrate, the maximum mass element is disposed in a region not including the center among the first region and the second region.

5. The electric device according to claim 1, wherein the plurality of terminal-soldered parts includes: a first terminal-soldered part to which the power supply terminal is soldered; and a second terminal-soldered part to which the connector terminal is connected, when one side of a virtual line connecting the two fixing parts is taken as a first region, and a side of the virtual line opposite to the first region is taken as a second region on the substrate, the first terminal-soldered part is disposed in one of the first region and the second region, and the second terminal-soldered part is disposed in the other of the first region and the second region.

6. The electric device according to claim 5, wherein the maximum mass element is a capacitor, the electric elements include a noise cut filter element with the second largest mass after the capacitor, the first terminal-soldered part, the capacitor, and the noise cut filter element are disposed in a region with a smaller area among the first region and the second region, and the noise cut filter element is disposed in a position closer to the first terminal-soldered part than the capacitor.

7. The electric device according to claim 1, wherein the fixing parts are fixed to the housing by means of a screw or crimping.

8. The electric device according to claim 7, wherein the housing includes a wall portion surrounding a periphery of the substrate, and the screw penetrates the substrate and is screwed to a columnar part in a state where the substrate is in contact with the columnar part provided in a position spaced apart from the wall portion in the housing in each of the two fixing parts.

9. The electric device according to claim 1, wherein the electric device is a motor, a stator is housed in the housing, the stator includes a stator core provided with a plurality of salient poles lining in a circumferential direction, and a coil wound around the salient poles, a rotor is disposed inside the stator, the power consumption part is the coil, the power supply terminal is a winding-wire terminal connected to the coil, and the rotor is rotated with respect to the stator by applying current to the coil.

10. A pump device comprising:

the electric device according to claim 9; and an impeller, rotary driven by the electric device.

* * * * *